United States Patent [19]

Bowers et al.

[11] 4,390,338

[45] Jun. 28, 1983

[54] BLOW PIN ASSEMBLY

[75] Inventors: Kenneth E. Bowers, Prairie Village, Kans.; Charles E. Markley, Kansas City, Mo.

[73] Assignee: Ethyl Development Corporation, Richmond, Va.

[21] Appl. No.: 322,422

[22] Filed: Nov. 18, 1981

[51] Int. Cl.³ .................. B29C 17/07; B29C 17/10
[52] U.S. Cl. ............................ 425/525; 264/503; 264/533; 264/536; 425/527; 425/535; 425/292
[58] Field of Search ............... 425/292, 525, 527, 531, 425/535; 264/503, 533, 536

[56] References Cited

U.S. PATENT DOCUMENTS

| 3,487,501 | 1/1970 | Siard et al. ............... 425/525 X |
| 3,657,406 | 4/1972 | Delebarre .................. 425/527 X |
| 3,782,877 | 1/1974 | Mehnert .................... 425/531 |
| 4,173,447 | 11/1979 | Bradbury .................. 425/535 X |

Primary Examiner—Jan H. Silbaugh
Attorney, Agent, or Firm—Donald L. Johnson; John F. Sieberth; Edgar E. Spielman, Jr.

[57] ABSTRACT

A blow pin assembly for use in blow molding extruded thermoplastic parisons is disclosed. The assembly provides a blow pin tip which effects forge formation of structure on the inside surface of the neck finish of the container. The blow pin assembly utilizes a rotation collar and a cutter collar to aid in removal of any neck moil associated with the blow molding procedure.

10 Claims, 9 Drawing Figures

BLOW PIN ASSEMBLY

BACKGROUND OF THE INVENTION

Hollow thermoplastic containers have long been produced by the blowing of an extruded tube captured between two mold halves. The captured extruded tube will have a portion which extends out of the blow mold adjacent to the neck portion of the mold. When the blow pin tip is lowered into the extruded tube, to a point adjacent or below the neck portion of the mold, the outside portion of the extruded tube, generally referred to as the neck moil, is pinched between a cutter collar mounted above the blow pin tip and an anvil formed by the blow mold halves. The introduction of the blow pin tip also forge forms the neck finish and provides a conduit for the introduction of blow air to the interior of the captured extruded tube. Blow air is then introduced through the blow pin tip to inflate the captured tube to the shape of the mold halves. Cooling fluid is passed through internal traces in the mold halves thereby cooling the blown container to insure that it is rigid enough to remove from the mold. The neck moil must then be removed from the completed container so that a commercially acceptable product is produced. Despite the pinching action of the cutter collar the neck moil generally will still adhere to the container neck principally due to the fact that the neck moil is not cooled and remains fairly soft and plastic. Removal is conventionally achieved by engaging a rotation collar, which fits about the cutter collar, with the moil so that the moil can be tightly gripped and rotated to shear it from the container. Such a procedure is mechanically efficient and is ideally suited when producing containers having conventional neck finishes, i.e. neck finishes with forge formed structure, such as a helical thread, about the outside surface of the neck finish but without any forge formed structure about the inside surface of the neck finish. However, when it is necessary to produce the neck finish having molded structure about its inside surface, the utilization of the rotative movement to aid in neck moil removal cannot be used. This is due to the fact that the blow pin tip carries die to form the inside surface molded structure and thus rotation of the blow pin tip will result in damage or disfigurement of the molded structure as such structure will be in rotative interference with the die that produced it.

Therefore, it is an object of this invention to provide a blow pin assembly which utilizes rotative motion, in combination with a cutter collar and a rotation collar, to remove the neck moil from a blow molded article which at the same time is capable of forming a neck finish for the blown article, which neck finish has molded structure about its outside surface and about its inside surface.

THE INVENTION

This invention relates to a blow pin assembly for use in blow molding extruded thermoplastic parisons to form containers having a neck finish. The blow pin assembly of this invention provides a conduit for the passage of blow air to the extruded parison captured in a blow mold and is capable of removing the neck moil associated with the captured extruded parison. In addition, the subject blow pin assembly is capable of forge forming a structure on the inside surface of the neck finish as well as forge forming a structure on the outside surface of the neck finish.

Structurally, the blow mold assembly of this invention features a hollow, elongated blow pin stem which is powered for rotation about its long axis. By being hollow, the blow pin stem provides a conduit for the passage of blow air to the extruded parison. There is additionally provided a rotation collar for gripping the neck moil. The rotation collar is mounted to the blow pin stem in a manner such that rotation of the blow pin stem about its long axis imparts rotative motion to the rotation collar. To facilitate removal of the neck moil, a cutter collar is also mounted to the blow pin stem and acts in conjunction with an anvil carried by the blow mold to pinch the neck moil so that its point of attachment to the neck finish is at least weakened. Positioned adjacent the lowermost extent of the blow pin stem is a blow pin tip which has die for the forge formation of structure on the inside surface of the neck finish. The blow pin tip is mounted to the blow pin stem so that it is free from following the rotation of the blow pin stem.

In a preferred form, the blow pin assembly of this invention features the cutter collar being mounted to the blow pin stem so that rotation of the stem about its long axis imparts rotative motion to the cutter collar. By having the cutter collar rotate, a cutting action is achieved which enhances removal of the neck moil even when it is in a soft and plastic condition.

In operation, the blow pin assembly of this invention is highly efficient, while remaining the paragon of simplicity. When the split blow mold halves are in the open position, the blow pin assembly is positioned above them. After the extruded parison is located between the split blow molds, they close thereupon pinching off the bottom portion of the parison while leaving the uppermost portion of the parison protruding from the upper extent of the closed blow mold. The blow pin assembly is lowered so that the blow pin tip enters into the upper end of that portion of the extruded parison which is captured between the split blow molds. The blow pin tip is dimensioned so that, upon lowering, it presses that portion of the parison which it contacts against the neck finish defining portion of the blow mold. This pressing or forging yields structure, such as a helical thread, on the outside of the neck finish. However, with the blow pin assembly of this invention, the inside surface of the neck finish can also have forge formed structure. For example, if it is desired to provide inwardly directed ratchet teeth about the inside upper surface of the neck finish, the blow pin tip will carry a die to effect formation of such teeth. (This is somewhat different from the case where structure is formed on the outside surface of the neck finish as in that case the "die" is provided by the blow mold.)

Lowering of the blow pin assembly for the purpose of introduction of the blow pin tip into the extruded parison also effects pinching of the neck moil between the cutter collar and the anvil carried by the blow mold. Even further, the rotation collar obtains a grip on the neck moil. Generally speaking, this grip is achieved by providing the rotation collar with a serrated lower edge which acts to effect penetration of the neck moil surface. After the blow pin assembly has been lowered as described above, blow air is introduced through the blow pin stem to inflate the parison captured in the blow mold. After cooling of the blown parison has been achieved, the blow pin stem is rotated. Since the rotation collar has achieved gripping contact with the moil, this rotative motion is transferred to the neck moil which aids in its removal from the blown parison. Even though the blow pin assembly is able to avail itself of the beneficial rotative motion for removal of the neck moil, this rotative motion is not transferred to the blow pin tip. Thus, the formation of structure about the inside surface of the neck finish is not compromised. If the blow pin tip followed the rotation of the blow pin stem, the forge formed structure on the inside surface would be damaged, if not completely destroyed. Thus, the blow pin assembly of this invention makes possible the use of the rotative motion of the blow pin stem to facilitate removal of the neck moil while at the same time is capable of forming structure about the inside surface of the neck moil.

These and other features of this invention contributing satisfaction in use and economy and manufacture will be more fully understood from the following description of a preferred embodiment in the accompanying drawings in which identical numerals refer to identical parts and in which.

Figure 1:
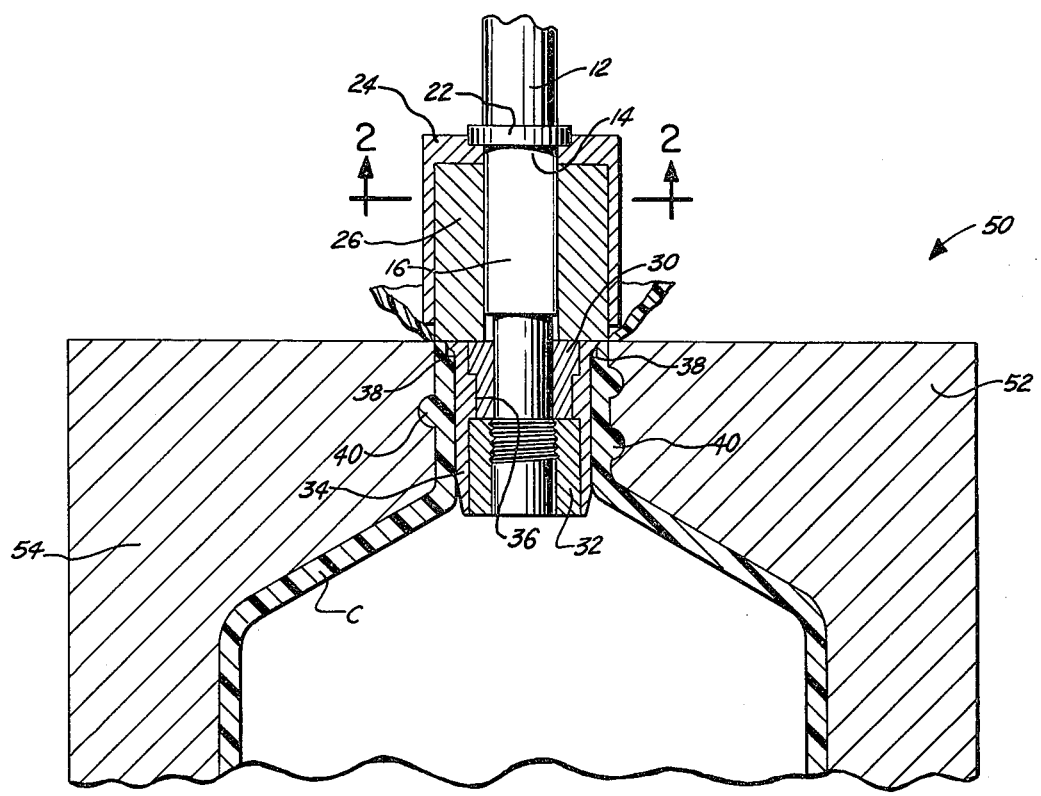
FIG. 1 is a partial sectional view of a blow pin assembly of this invention shown in conjunction with a partial view of the split blow mold.

Referring now to FIGS. 1, 2 and 4–9, there can be seen a blow pin assembly of this invention, generally designated by the numeral 10. In FIG. 1, blow pin assembly 10 is shown in association with a split blow mold, generally designated by the numeral 50, which split blow mold is made up of two split blow mold halves 52 and 54. Also, in FIG. 1 there is shown a container C which has been blown from an extruded parison which was previously captured between split blow mold halves 52 and 54. Immediately above the neck finish of container C, there can be seen neck moil M which is a waste portion of the blow molding procedure.

Figure 2:
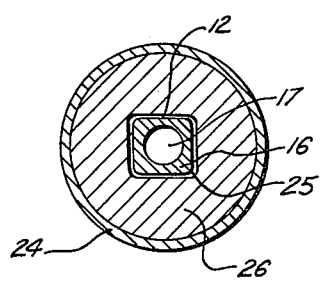
FIG. 2 is a sectional view taken through section lines 2—2 in FIG. 1.

Inserted within the neck finish portion of container C is a portion of blow pin assembly 10. The remaining portion of blow pin assembly 10 is located outside of blow mold 50. Blow pin assembly 10 includes a hollow, elongated blow pin stem 12 which has upwardly displaced from its terminal end stopping flange 22. Abutting stopping flange 22 is rotation collar 24 which has an annular recess therein, which recess accommodates and overlays a portion of cutter collar 26. At the bottom portion of rotation collar 24 there can be provided a serrated edge for aid in gripping of moil M. For the embodiment shown in the drawings, both rotation collar 24 and cutter collar 26 have substantially rectangular bores. The substantially rectangular bore 25 for cutter collar 26 is shown in FIG. 2. The substantially rectangular bore for rotation collar 24 is not shown in the drawings but is identical to the rectangular bore 25 for cutter collar 26. Both the rotation collar 24 and cutter collar 26 are slidably mounted to blow pin stem 12 so that their substantially rectangular bores overlie substantially rectangular portions 14 and 16 of blow pin stem 22. By utilizing a rectangular configuration for both the blow stem portions 14 and 16 and for the collar bores, it can be appreciated that rotative motion of blow pin stem 12 will effect rotative motion for collars 24 and 26.

To effect pinching of moil M, cutter collar 26 has a cutting edge 28 at its lowermost extent which acts against an anvil provided by split blow mold halves 52 and 54. The lowermost surface of cutter collar 24 can be used to form the uppermost extent of the mold cavity thereby defining the upper limits and configurations of the neck finish of container C.

Figure 9:
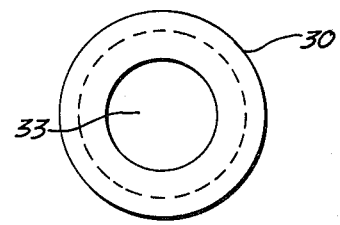
FIG. 9 is a top plan view of the bushing shown in FIG. 8.

Abutting the lowermost surface of cutter collar 26 is bushing 30. Bushing 30 has an annular recess 31 which has a reduced outside diameter 31. As can be seen in FIG. 9, bushing 30 has a circular bore 33 therethrough which slidably mounts to the lower portion of blow pin stem 12. This lower portion is circular in cross-section. Near the terminal end of lower portion 20 there are provided threads 18. Threaded onto threads 18 is lock nut 32 which is tightened to snug bushing 30 against cutter collar 26 which in turn snugs rotation collar 24 against stopping flange 22. Also, there is captured blow pin tip 34 by the threading of lock nut 32 onto threads 18. Note that blow pin tip 34 has an inwardly directed annular ring 36 which abuts annular recess 31. As can be seen in FIG. 1, this construction and assembly allows blow pin tip 34 to be free from the rotative motion of blow pin stem 12 as blow pin tip 34 is not locked thereto.

Figure 5:
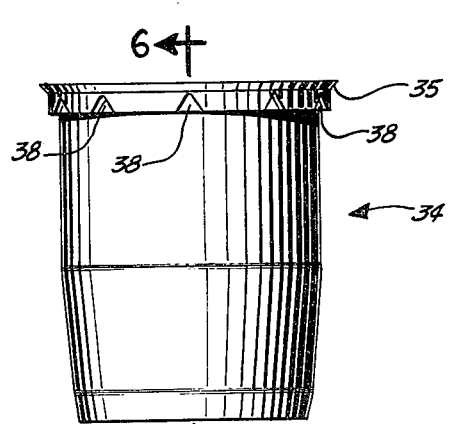
FIG. 5 is a side elevational view of the blow pin tip shown in FIG. 1.
Figure 6:
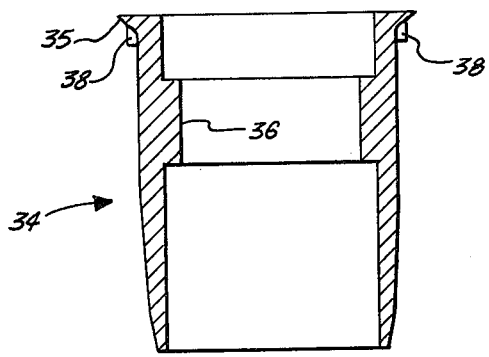
FIG. 6 is a sectional view taken through section lines 6—6.
Figure 7:
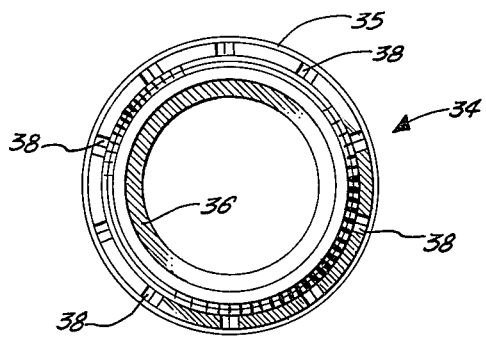
FIG. 7 is a bottom plan view of the blow pin tip shown in FIG. 5.
Figure 8:
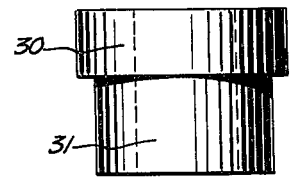
FIG. 8 is a side elevational view of the bushing shown in FIG. 1.

As is shown in FIGS. 5–7, blow pin tip 34 has at its uppermost extent die 35 which features die recesses 38. Die recesses 38 will forge form inwardly extending bosses about the inside surface of the neck finish of container C as hereinafter described.

Figure 3:
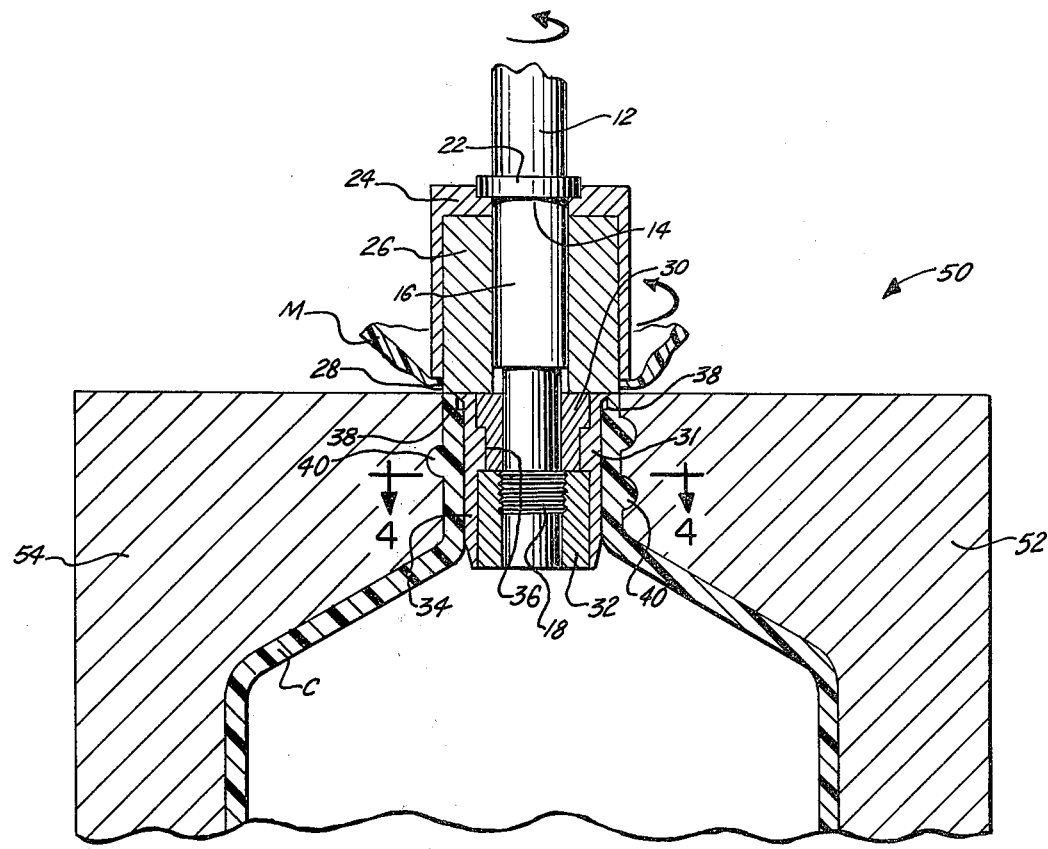
FIG. 3 is the same view shown in FIG. 1 except that of the blow pin stem depicted.
Figure 4:
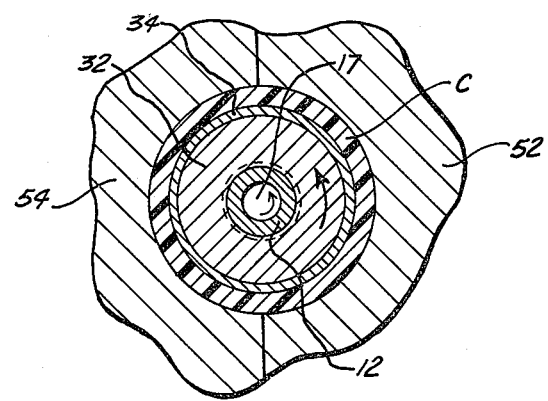
FIG. 4 is a sectional view taken through section lines 4—4 in FIG. 3.

In FIG. 1, blow pin assembly 10 is shown in the position it would assume during the forge forming step and the blowing step. Note that blow pin tip 34 presses the extruded parison into helical thread cavity 40 which is carried by split blow mold halves 52 and 54 to forge form a helical thread about the neck finish of container C. Also, die 38 will press into the captured extruded parison to provide the inwardly directed bosses about the inside surface of the neck finish of container C. At this time also, cutting edge 28 pinches neck moil M against the anvil provided by the split blow mold halves. Air is introduced through bore 17, which is shown in FIG. 2, of blow pin stem 12 to cause inflation of the extruded parison to form the body portion of container C. After cooling of the blown container in blow mold 50 has been accomplished, blow pin stem 12 is caused to rotate as shown in FIG. 3. This rotation effects rotation of cutter collar 26 and rotation collar 24. As mentioned previously, it is preferred to have cutter collar 26 rotate to accentuate the pinching action and to thereby substantially cut moil M from the top of container C. To further aid in removal of moil M, rotation of rotation collar 24 is provided aid in pulling the moil away from the neck finish of container C. This pulling away is very useful where the pinching action of cutter collar 26 does not effect complete separation of moil M from the container in neck finish. After neck moil separation has been effected, rotation of blow pin stem 12 is stopped and blow assembly 10 is removed upwardly and axially from container C. Blow mold halves 52 and 54 separate, thereby releasing blown container C so that it can be moved to packaging or to subsequent container finishing steps.

While the invention has been described in detail in connection with the depicted embodiments, the descriptions and illustrations are in no way intended to limit the scope of the invention.

What is claimed:

1. A blow pin assembly for use in blow molding extruded thermoplastic parisons to form containers having a neck finish, which assembly: provides a conduit for the passage of blow air to the extruded parison captured in a blow mold; effects removal of the neck moil associated with the captured extruded parison; and which forge forms structure on the inside surface of the neck finish, said blow pin assembly comprising:
   a. a hollow, elongated blow pin stem, said blow pin stem being powered for rotation about its long axis;
   b. a rotation collar for gripping said neck moil, said rotation collar being mounted to said blow pin stem whereby rotation of said blow pin stem about its long axis imparts rotative motion to said rotation collar;
   c. a cutter collar mounted to said blow pin stem for pinching said neck moil against an anvil carried by said blow mold; and
   d. a blow pin tip, having a die for the forge formation of said forge formed structure, said blow pin tip mounted to said blow pin stem whereby said blow pin tip is free from following said rotation of said blow pin stem.

2. The blow pin assembly of claim 1 wherein said cutter collar is mounted to said blow pin stem whereby rotation of said stem about its long axis imparts rotative motion to said cutter collar.

3. The blow pin assembly of claim 1 wherein said blow pin stem has a substantially rectangular cross-section in the area of the mounting of said rotation collar to said blow pin stem and said rotation collar is slidably mounted to said blow pin stem by way of a substantially rectangular hole therethrough.

4. The blow pin assembly of claim 3 wherein said blow pin stem has a substantially rectangular cross-section in the area of the mounting of said cutter collar to said blow pin stem and said cutter collar is slidably mounted to said blow pin stem by way of a substantially rectangular hole therethrough whereby rotation of said blow pin stem about its long axis imparts rotative motion to said cutter collar.

5. The blow pin assembly of claim 4 wherein said rotation collar has an annular cavity therein into which a portion of said cutter collar nests whereby said rotation collar overlies said portion of said cutter collar.

6. The blow pin assembly of claim 5 wherein there is additionally provided:
   i. a hollow bushing which slidably mounts to said blow pin stem so that said hollow bushing abuts the lowermost extent of said cutter collar, said bushing having a lower portion of reduced outside diameter, and
   ii. a snugging means having an outside diameter greater than the diameter of said portion of reduced outside diameter, said snugging means being threadably mounted to the terminal end of said blow pin stem for snugging said collars and said hollow bushing one to the other; and wherein said blow pin abuts at its upper end said cutter collar and has, intermediate its ends, an annular inwardly extending ring having a diameter larger than the diameter of said portion of reduced outside diameter but less than the outside diameter of said snugging means whereby said blow pin tip achieves its mounting to said blow pin stem.

7. The blow pin assembly of claim 1 wherein said rotation collar and said cutter collar slidably mount to said blow pin stem and wherein said cutter collar is mounted to said blow pin stem so that rotation of said blow pin stem about its long axis imparts rotative motion to said cutter collar.

8. The blow pin assembly of claim 7 wherein said rotation collar has an annular cavity therein into which nests a portion of said cutter collar whereby said rotation collar overlies said portion of said cutter collar.

9. The blow pin assembly of claim 8 wherein there is additionally provided:
   i. a hollow bushing which slidably mounts to said blow pin stem so that said hollow bushing abuts the lowermost extent of said cutter collar, said bushing having a lower portion of reduced outside diameter, and
   ii. a snugging means having an outside diameter greater than the diameter of said portion of reduced outside diameter, said snugging means being threadably mounted to the terminal end of said blow pin stem for snugging said collars and said hollow bushing one to the other; and wherein said blow pin tip abuts at its upper end said cutter collar and has, intermediate its ends, an annular inwardly extending ring having a diameter larger than the diameter of said portion of reduced outside diameter but less than the outside diameter of said snugging means whereby said blow pin tip achieves its mounting to said blow pin stem.

10. The blow pin assembly of claim 9 wherein said snugging means is a lock nut.

* * * * *